UNITED STATES PATENT OFFICE.

JOHN GREGORY, OF NEWARK, NEW JERSEY.

PROCESS OF MAKING PHOSPHATIC FERTILIZERS.

SPECIFICATION forming part of Letters Patent No. 515,708, dated February 27, 1894.

Application filed July 18, 1893. Serial No. 480,834. (No specimens.)

*To all whom it may concern:*

Be it known that I, JOHN GREGORY, of Newark, in the county of Essex and State of New Jersey, have invented a new and Improved Process of Manufacturing Fertilizers, of which the following is a full, clear, and exact description.

The object of the invention is to provide a new and improved process for manufacturing fertilizers, in a cheap and simple manner from bone black which has been used as a filtering material for various oils.

The process consists principally in mixing the material with sulfuric acid, and then subjecting the mixture to the action of heat to boil the same, whereby the bone black forms a filter for the oil or other fatty substance contained in it.

In processes for the manufacture of fertilizers as heretofore practiced, the animal carcasses, offal and bones were first subjected to the action of sulfuric acid of a high density heated to a temperature below boiling point, and then raw phosphate was added, as is for instance, described in the Patent No. 494,940, granted to Ludwig Rissmuller and Henry Vollbrecht, under date of April 4, 1893.

In my process ordinary chamber sulfuric acid of about 45° Baumé is mixed with bone black, which has been used for filtering oil, and then the mixture is heated so that the bone black forms a filter for the oil or grease contained in it. Hitherto this bone black impregnated with oil could not be used in the manufacture of phosphates, and had to be freed from the oil which would have impaired the solubility of final product. According to my invention, this bone black containing oil may be used in the manufacture of phosphates, and the oil is separated from the bone black at the same time the phosphate is manufactured, so that the product will be free from oil.

In carrying the process into effect, I prefer to employ a suitable vessel containing a coil of pipes connected with a suitable source of steam supply, to heat the material placed in the vessel to about 300° Fahrenheit, or more if required. For bone black containing about twenty-five per cent. to thirty per cent. phosphoric acid, I add approximately one hundred and fifty per cent. to two hundred per cent. sulfuric acid of about 45° Baumé and then subject the mixture, for several hours, to the action of the heat radiating from the steam coil in the vessel, to cause the mixture to boil vigorously until ebullition ceases, and to separate the oil from the phosphate residue, the oil collecting on top of the latter.

In using bones and offal instead of bone black, as above described, the same operation is carried on; that is, the sulfuric acid is added to a mixture of the said material and bone black, and the mass is vigorously boiled to produce an emulsion of grease and meat, it being understood, however, that the grease or oil filters through the bone black to the top of the mass and is skimmed off whenever necessary; the oil and grease being entirely free of gurry a mixture consisting chiefly of meat, grease, and water which heretofore has always been a source of trouble in treating matters of this kind.

In case meat scrap is used, sulfuric acid is first added to it and the mass boiled, and as soon as boiling begins the bone black is added and the entire mass subjected to a boiling process until the mass has become heavy and ebullition ceases. It will be understood that the sulfuric acid used will be of such a density that when it is added to the material, the acid solution will have a density of about 45° Baumé, so as to permit of boiling the mixture at a temperature of about 300° Fahrenheit. As the acid has freed the grease or oil from the meat and bone, the heat and difference in specific gravity cause the grease and oil to rise, and in its upward movement filters through the bone black and is thus cleared from gurry. The oil collecting on top of the mass is run off to a suitable receptacle, and the residue contained in the vessel is capable of being used as a fertilizer. By this process all the valuable properties contained in the bone black, meat and bone, and necessary for the formation of a valuable fertilizer, are entirely retained, and consequently a phosphate of a high grade is the residue product of boiling.

Having thus fully described my invention,

I claim as new and desire to secure by Letters Patent—

1. The herein described process for manufacturing fertilizers, consisting of mixing bone black previously used as a filtering material for oil, with sulfuric acid, then boiling the mixture to cause the greasy substances contained in the material to rise and filter through the bone black, and separating the residue from the greasy substances substantially as described.

2. The herein described process for the manufacture of fertilizers, consisting in subjecting a mixture of bones or offal with bone black, to the action of sulfuric acid to render the said materials soluble, and then boiling the mixture to separate the greasy substances from the meat and bone, and to cause the greasy substances to rise and filter through the bone black, to collect on top of the residual product, and separating the residue from the greasy substances substantially as shown and described.

JOHN GREGORY.

Witnesses:
W. H. C. JACKSON,
EBENEZER C. HAY.